(12) United States Patent
Kadowaki

(10) Patent No.: US 7,921,961 B2
(45) Date of Patent: Apr. 12, 2011

(54) CHROMATE-FREE RESIN-COMPOSITE VIBRATION DEADENING MATERIAL

(75) Inventor: Nobuo Kadowaki, Tokai (JP)

(73) Assignee: Nippon Steel Corporation, Tokyo (JP)

( * ) Notice: Subject to any disclaimer, the term of this patent is extended or adjusted under 35 U.S.C. 154(b) by 981 days.

(21) Appl. No.: 11/720,823

(22) PCT Filed: Nov. 29, 2005

(86) PCT No.: PCT/JP2005/022263
§ 371 (c)(1),
(2), (4) Date: Jun. 4, 2007

(87) PCT Pub. No.: WO2006/059761
PCT Pub. Date: Jun. 8, 2006

(65) Prior Publication Data
US 2010/0126796 A1    May 27, 2010

(30) Foreign Application Priority Data

Dec. 3, 2004    (JP) .................. 2004-351152
Aug. 4, 2005    (JP) .................. 2005-226971

(51) Int. Cl.
*F16F 15/02* (2006.01)
*F16F 7/00* (2006.01)
*F16F 15/00* (2006.01)

(52) U.S. Cl. ....................... 181/207; 181/209
(58) Field of Classification Search .......... 181/207, 181/209
See application file for complete search history.

(56) References Cited

U.S. PATENT DOCUMENTS

| | | | | |
|---|---|---|---|---|
| 3,648,828 | A * | 3/1972 | McCaffrey et al. | 198/763 |
| 4,330,446 | A * | 5/1982 | Miyosawa | 523/409 |
| 4,346,782 | A * | 8/1982 | Bohm | 181/207 |
| 4,859,523 | A * | 8/1989 | Endoh et al. | 428/215 |
| 4,923,034 | A * | 5/1990 | Okuzawa et al. | 181/207 |
| 4,942,219 | A * | 7/1990 | Yatsuka et al. | 528/272 |
| 5,183,863 | A * | 2/1993 | Nakamura et al. | 525/438 |
| 5,288,813 | A * | 2/1994 | Hirakouchi et al. | 525/438 |
| 5,411,810 | A * | 5/1995 | Hirakouchi et al. | 428/480 |
| 5,691,037 | A * | 11/1997 | McCutcheon et al. | 428/172 |
| 5,895,538 | A * | 4/1999 | Hatayama et al. | 156/87 |
| 6,120,889 | A * | 9/2000 | Turner et al. | 428/221 |
| 6,177,173 | B1 * | 1/2001 | Nelson | 428/137 |
| 6,235,348 | B1 * | 5/2001 | Shimizu et al. | 427/388.1 |
| 6,475,300 | B2 * | 11/2002 | Shimakura et al. | 148/247 |
| 6,482,274 | B2 * | 11/2002 | Shimakura et al. | 148/247 |
| 6,514,357 | B1 * | 2/2003 | Tada et al. | 148/251 |
| 6,536,555 | B1 * | 3/2003 | Kelsic et al. | 181/207 |
| 6,572,983 | B2 * | 6/2003 | Shimakura et al. | 428/681 |
| 6,736,908 | B2 * | 5/2004 | Sako et al. | 148/25 |
| 6,890,648 | B2 * | 5/2005 | Yano et al. | 428/331 |
| 2003/0072962 | A1 * | 4/2003 | Matsuzaki et al. | 428/623 |
| 2006/0182948 | A1 * | 8/2006 | Watase et al. | 428/323 |
| 2007/0012220 | A1 * | 1/2007 | Matsuda et al. | 106/462 |
| 2007/0048550 | A1 * | 3/2007 | Millero et al. | 428/704 |
| 2007/0149682 | A1 * | 6/2007 | Ragunathan | 524/442 |
| 2008/0057336 | A1 * | 3/2008 | Kurokawa et al. | 428/639 |
| 2008/0248317 | A1 * | 10/2008 | Tsuchida et al. | 428/447 |

FOREIGN PATENT DOCUMENTS

| | | | |
|---|---|---|---|
| JP | 50143880 | | 11/1975 |
| JP | 5191981 | | 8/1976 |
| JP | 52093770 | | 8/1977 |
| JP | 55027975 | | 2/1980 |
| JP | 56159160 | | 12/1981 |
| JP | 57034949 | | 2/1982 |
| JP | 60088149 | | 5/1985 |
| JP | 62295949 | | 12/1987 |
| JP | 63075056 | A * | 4/1988 |
| JP | 63202446 | | 8/1988 |
| JP | 01198622 | | 8/1989 |
| JP | 01198622 | A * | 8/1989 |
| JP | 04048081 | | 2/1992 |
| JP | 04103657 | A * | 4/1992 |
| JP | 11277671 | | 10/1992 |
| JP | 06329770 | | 11/1994 |
| JP | 06329770 | A * | 11/1994 |
| JP | 07179735 | | 7/1995 |
| JP | 07179735 | A * | 7/1995 |
| JP | 2001089868 | | 4/2001 |
| JP | 203055777 | | 2/2003 |
| JP | 2003327846 | | 11/2003 |
| JP | 2004043886 | | 2/2004 |
| JP | 2005206921 | A * | 8/2005 |
| KR | 10-1996-0007823 | A | 3/1996 |
| KR | 1996-0007823 | | 3/1996 |
| KR | 10-2004-0027416 | A | 4/2004 |
| KR | 2004-27416 | | 4/2004 |

OTHER PUBLICATIONS

English translation of Korean Intellectual Property Office Notice of Preliminary Rejection.
Korean Office Action 9-5-2008-016954896.
English Language International Search Report for PCT/JP2005/022263.

* cited by examiner

*Primary Examiner* — Edgardo San Martin
(74) *Attorney, Agent, or Firm* — Dorsey & Whitney LLP

(57) ABSTRACT

A chromate-free resin composite damping material is provided having a multilayer structure. The material can include an viscoelastic resin composition provided between two metal plates as an intermediate layer, where the viscoelastic resin composition can include a thermosetting resin further including an amorphous copolymerizable polyester resin and a curing agent. A surfaces of each metal plate contacting the resin composition can be provided with a chromate-free adhesion boundary film which includes between about 5 and 50 mass % of silica, between about 5 and 50 mass % of a polyester resin, between about 1 and 50 mass % of tannic acid, and between about 0 and 30 mass % of a silane coupling agent. Such damping material can provide excellent durable adhesion properties.

7 Claims, No Drawings

CHROMATE-FREE RESIN-COMPOSITE VIBRATION DEADENING MATERIAL

CROSS-REFERENCE TO RELATED APPLICATIONS

This application is a national stage application of PCT Application No. PCT/JP2005/022263 which was filed on Nov. 29, 2005 and published on Jun. 8, 2006 as International Publication No. WO 2006/059761, the entire disclosure of which is incorporated herein by reference. This application claims priority from the International Application pursuant to 35 U.S.C. §365, and from Japanese Patent Application Nos. 2004-351152, filed Dec. 3, 2004, and 2005-226971, filed Aug. 4, 2005, under 35 U.S.C. §119, the entire disclosures of which are also incorporated herein by reference.

FIELD OF THE INVENTION

The present invention relates to a vibration-deadening composite material and, more particularly, to a vibration-deadening composite material which may exhibit high vibration deadening properties and have excellent bonding strength, and which may further exhibit excellent workability and heat resistance. Such material may be used, e.g., to form structural members of industrial machines, transportation machines, home appliances, acoustic equipment, electronic equipment, information equipment, buildings, and other structures or portions thereof.

BACKGROUND INFORMATION

In recent years, particularly in industrial fields such as manufacturing and transportation, improvement of the work environment on production floors can be important. For example, standards for allowable levels of noise and vibration are becoming more severe. Further, noise in residential environments may be troublesome for neighbors, and quieter performance may also be desirable for home electrical appliances and machinery products.

Vibrations can be easily transmitted in equipment that includes metal materials. Metal panels can often be a source of noise. Therefore, countermeasures for preventing or reducing vibration and noise can be desirable.

Conventional vibration-deadening materials which may be used for preventing noise and vibration can include, e.g., composite materials having a multilayer structure which includes metal layers surrounding an intermediate layer made of a viscoelastic resin composition. Such material can convert vibrational energy to heat energy, e.g., by slip deformation of the intermediate viscoelastic resin layer which may occur during vibrational bending of the material, which may attenuate the vibration rate and amplitude, and thereby reduce sound propagation. Such composite material can provide better vibration-deadening performance, e.g., when it is in direct contact with a vibration source or when used as a cover or other part of a vibration source.

Such composite vibration-deadening materials may be used, for example, in automobile oil pans, engine head covers, engine room shield plates, dash panels, floor panels, gear covers, chain covers, muffler covers, mufflers, floor housings, and other parts of automobiles, motorcycles, farm machinery, motor covers, compressor covers, evaporator covers and other parts of freezing temperature adjustment equipment, computer cases, hard disk drive cases, speaker frames and other parts of acoustic electronic equipment, chain saw covers, generator covers, lawn mower covers and other parts of outdoor equipment, steps, doors, flooring, roofing, and other construction materials, and other applications.

Metal materials which may be used, for example, in household electrical products and automobiles, can be treated with chromate treatment. Such chromate treatment can be inexpensive and may provide excellent corrosion resistance, and may be widely used as a paint undercoat and/or for temporary rust prevention. However, in view of concerns about the global environment, use of environmental loading substances (e.g., lead, hexavalent chromium, cadmium, mercury, etc.) has been subject to increasingly strict regulation in recent years.

To improve bondability between the metal sheet and the intermediate viscoelastic resin layer in a conventional composite vibration-deadening material, a chromate treatment can be applied as an undercoat treatment of the metal sheet bonding surface. However, a composite vibration-deadening material which can be made without using chromate may be preferable, e.g., for environmental reasons.

Various studies have been performed to find techniques to replace chromate when surface treating steel sheet. For example, Japanese Patent Publication (Kokai) No. 04-48081 describes a method of surface treatment using a transition metal-based (e.g., from the VIA group) aqueous ammonium molybdate solution which may have a passivation performance similar to that of chromic acid.

Further, Japanese Unexamined Patent Publication (Kokai) No. 2003-55777 describes a chromate-free treated hot dip zinc-aluminum alloy plated steel sheet having a coat containing a zirconium compound and a vanadic compound. Japanese Unexamined Patent Publication (Kokai) No. 2001-89868 describes an example of a non-chromate chemical treatment containing a tannic acid, a silane coupling agent, and silica particles.

Many conventional viscoelastic resins or viscoelastic resin compositions can be used in an intermediate layer of a composite vibration-deadening material. Such resins or resin compositions can include, for example, a polyester resin (as described, e.g., in Japanese Unexamined Patent Publication (Kokai) No. 50-143880) a resin composition which may include a polyester resin and a plasticizer (as described, e.g., in Japanese Unexamined Patent Publication (Kokai) No. 52-93770), a resin compositions obtained by combining a plurality of polyester resins as described, e.g., in Japanese Unexamined Patent Publication (Kokai) No. 62-295949 and Japanese Unexamined Patent Publication (Kokai) No. 63-202446), a polyurethane resin foam (as described, e.g., in Japanese Unexamined Patent Publication (Kokai) No. 51-91981), a polyamide resin (as described, e.g., in Japanese Unexamined Patent Publication (Kokai) No. 56-159160), an ethylene-vinyl acetate copolymer (as described, e.g., in Japanese Unexamined Patent Publication (Kokai) No. 57-34949), an isocyanate prepolymer and vinyl monomer copolymer (as described, e.g., in Japanese Unexamined Patent Publication (Kokai) No. 55-27975), or a polyvinyl acetal resin as described, e.g., in Japanese Unexamined Patent Publication (Kokai) No. 60-88149), etc.

Cross-linking agents may be used, for example, in a viscoelastic resin composition containing a specific amorphous block copolymerizable polyester resin which may include a high glass transition temperature segment and a low glass transition temperature segment such as a lactone component (as described, e.g., in Japanese Unexamined Patent Publication (Kokai) No. 01-198622), a viscoelastic resin composition containing a polyester resin synthesized using a glycol having a dimer acid or a hydrogenated dimer acid and a side chain as a starting material (as described, e.g., in Japanese Unexamined Patent Publication (Kokai) No. 06-329770), a viscoelastic resin composition containing a copolymerizable polyester resin having an aromatic ring in the side chain (as described, e.g., in Japanese Unexamined Patent Publication (Kokai) No. 06-329771), a viscoelastic resin composition containing a copolymerizable polyester resin having a side chain containing five or more carbon atoms (as described, e.g., in Japanese Unexamined Patent Publication (Kokai) No. 07-179735), and so on.

Chromate-free treatment may be used for surface treated steel sheets. However, it may be desirable to provide a chromate-free bonding undercoat treatment which can generate a bondability equivalent to that obtained using a chromate treatment, particularly a durable bondability, for a composite vibration-deadening material.

For example, viscoelastic resin compositions such as those described in Japanese Unexamined Patent Publication (Kokai) No. 01-198622, Japanese Unexamined Patent Publication (Kokai) No. 06-329770, Japanese Unexamined Patent Publication (Kokai) No. 06-329771, and Japanese Unexamined Patent Publication (Kokai) No. 07-179735, can be based on thermosetting polyester-based resins and may create hydrogen bonds with a chromic acid hydrate of a chromate treatment applied to the surface of the metal sheet to generate a high bonding strength. A conventional chromate-free treatment, however, may not provide a bonding strength as good as that of a chromate treatment.

Thus, there may be a need for improved systems, methods, software arrangements and computer-accessible media for press-forming of materials which overcome the above-mentioned deficiencies.

SUMMARY OF EXEMPLARY EMBODIMENTS OF THE INVENTION

One object of the present invention is to provide a chromate-free composite vibration-deadening material having an excellent bonding strength, which may exhibit a durable bondability equivalent to that provided by a conventional chromate-treated composite vibration-deadening material. Such a material can be provided, for example, by using a particular vibration-deadening resin together with a particular chromate-free undercoat agent.

Exemplary embodiments of the present invention can provide, e.g., a chromate-free resin composite vibration-deadening material which can have a multilayer structure which includes a viscoelastic resin composition sandwiched between metal sheets as an intermediate layer. Such material may exhibit an excellent durable bondability. The viscoelastic resin composition can be a thermosetting resin which includes, e.g., an amorphous copolymerizable polyester resin and a curing agent. Surfaces of the metal sheets which contact the viscoelastic resin layer can be provided with chromate-free bonding undercoats that include, e.g., between about 5 and 50 mass % of silica, between about 5 and 50 mass % of a polyester resin, between about 1 and 50 mass % of tannic acid, and between about 0 and 30 mass % of a silane coupling agent.

The curing agent can include, e.g., a polyepoxy compound, a polyisocyanate compound, or an acid anhydride. The amount of chromate-free bonding undercoat deposited or otherwise provided on the metal sheet surface can be between, e.g., about 3 and 900 mg/m$^2$. Further, the metal sheet can include, e.g., a steel sheet, a plated steel sheet, a stainless steel sheet, a aluminum sheet, or a titanium sheet.

Exemplary embodiments of the present invention can include undercoat treatment layers on the surfaces of the metal sheets contacting the viscoelastic resin layer which may not contain hexavalent chromium, which may be environmentally preferable to such layers which are formed using conventional chromate-based undercoat treatments.

Exemplary embodiments of the present invention can provide a resin composite vibration-deadening material containing a chromate-free bonding undercoat which may include between about 5 and 50 mass % of silica, between about 5 and 50 mass % of polyester resin, between about 1 and 50 mass % of tannic acid, and between about 0 and 30 mass % of a silane coupling agent. Such material may further include a viscoelastic resin composition (e.g., a thermosetting viscoelastic resin composition which includes an amorphous copolymerizable polyester resin and a curing agent). An initial bonding strength of such material can be equivalent to that of a conventional resin-composite vibration-deadening material which may be formed using a chromate-based bonding undercoat agent, and which may exhibit excellent shaping properties. Further, such material may exhibit durable bondability that is equivalent to that of a conventional resin-composite vibration-deadening material formed using a chromate-based bonding undercoat agent, and thus may be useful as a vibration and noise reduction material while having a small environmental load.

Further exemplary embodiments of the present invention can provide a resin composite vibration-deadening material exhibiting a high vibration deadening performance and a high bonding strength which includes a viscoelastic resin composition that contains a cross-linking agent and a mixture of a plurality of viscoelastic resins.

These and other objects, features and advantages of the present invention will become apparent upon reading the following detailed description of embodiments of the invention, when taken in conjunction with the appended claims.

DETAILED DESCRIPTION OF EXEMPLARY EMBODIMENTS OF THE INVENTION

Viscoelastic Resin Composition

An amorphous copolymerizable polyester resin containing polycarboxylic acid bonding units, polyol bonding units, and/or polyhydroxycarboxylic acid block bonding units can be provided as a component of a viscoelastic resin composition used in exemplary embodiments of the present invention.

The term "amorphous" as used herein can refer to, e.g., a lack of a clear crystal melting peak when the temperature of a material is raised, e.g., from about −100° C. to 300° C. at a temperature elevation rate of about 20° C./min in a nitrogen atmosphere as measured by a differential scan calorimeter (DSC).

An amorphous polyester resin can improve the vibration deadening performance, and may also avoid such phenomena as, e.g., a drop in bonding strength along with aging due to the advance of the crystallization, which may be observed in a crystalline polyester resin.

Polycarboxylic acid bonding units of the amorphous copolymerizable polyester resin which may be used in exemplary embodiments of the present invention may include, e.g., greater than about 40 mol % or, more preferably, greater than about 50 mol %, of polycarboxylic acid bonding units which are aromatic dicarboxylic acid units. The content of such aromatic dicarboxylic acid bonding units may be as high as 100 mol %. For example, if the content of the aromatic dicarboxylic acid bonding units is less than about 40 mol %, the bonding strength and heat resistance of the viscoelastic resin composition may become insufficient.

Monomers which may be used to form aromatic dicarboxylic acid bonding units of the amorphous copolymerizable polyester resin used in exemplary embodiments of the present invention can include aromatic carboxylic acids such as, e.g., terephthalic acid, isophthalic acid, orthophthalic acid, 1,5-naphthalene dicarboxylic acid, 2,6-naphthalene dicarboxylic acid, 4,4'-biphenyl carboxylic acid, 2,2'-biphenyl dicarboxylic acid, diphenyl methane dicarboxylic acid, phenyl indene dicarboxylic acid, 5-sodium sulfoisophthalic acid, and ester-forming derivatives of the same. An aromatic dicarboxylic acid such as terephthalic acid or isophthalic acid may be preferable based on vibration deadening properties and ease of acquisition. Further, such aromatic dicarboxylic acids and ester-forming derivatives of them may be used singly or in combinations of two or more types.

Monomers which may be used to form polycarboxylic acid bonding units can include, in addition to aromatic dicarboxylic acid bonding units, alicyclic dicarboxylic acids such as 1,4-cyclohexane dicarboxylic acid, 1,3-cyclohexane dicarboxylic acid, and 1,2-cyclohexane dicarboxylic acid, and ester forming derivatives of the same; alkenyl succinic acids such as succinic acid, glutaric acid, adipic acid, pimelic acid, suberic acid, azelic acid, sebacic acid, dodecane diacid, eicosane diacid, 2-methylsuccinic acid, 2-methyladipic acid, 3-methyladipic acid, 3-methylpentane dicarboxylic acid, 2-methyloctane dicarboxylic acid, 3,8-dimethyldecane dicarboxylic acid, 3,7-dimethyldecane dicarboxylic acid, 9,12-dimethyleicosane diacid, dimer acid, hydrogenated dimer acid, octenyl anhydride succinic acid, dodecenyl anhydride succinic acid, pentadecenyl anhydride succinic acid, and octadecenyl anhydride succinic acid; aliphatic dicarboxylic acids such as fumaric acid, maleic acid, itaconic acid, 8,12-eicosadiene dicarboxylic acid, and ester forming derivatives of the same. Such polycarboxylic acids and ester forming derivatives of the same may be used singly or in combinations of two or more types.

Further, such polycarboxylic acids and ester-forming derivatives of the same may preferably include, e.g., adipic acid, azelic acid, sebacic acid, dimer acid, hydrogenated dimer acid, alkenyl succinic acid, etc., and sebacic acid, dimer acid, hydrogenated dimer acid, alkenyl succinic acid, etc., which may provide improved vibration deadening performance.

For example, polycarboxylic acid units formed using sebacic acid, dimer acid, hydrogenated dimer acid and/or alkenyl succinic acid as a starting material can be provided in an amount of about 2 mol % or more, or preferably about 5 mol % or more, of the polycarboxylic acid bonding units to provide, e.g., improved vibration deadening performance and an adjustment of a glass transition temperature of the resin. Further, a content of such polycarboxylic acid bonding units may be about 60 mol % or less, or preferably about 50 mol % or less. If the content of the polycarboxylic acid bonding units is less than about 2 mol %, the vibration deadening performance may become insufficient, or it may become difficult to adjust the glass transition temperature of the resin to a desired value. Further, when the content of the polycarboxylic acid bonding units exceeds about 60 mol %, the bonding strength may become insufficient.

Monomers which may be used to form the polycarboxylic acid bonding units in exemplary embodiments of the present invention can include, e.g., a trifunctional or higher polycarboxylic acid such as trimellitic acid or pyromellitic acid, which may be provided in a small amount so as not to degrade characteristics of the viscoelastic resin composition. Such trifunctional or higher polycarboxylic acid may be provided, e.g., in a concentration of about 0.5 mol % or more, or preferably about 1 mol % or more. Further, the content of such trifunctional or higher polycarboxylic acids may be preferably about 10 mol % or less, or preferably about 5 mol % or less. When the content of such trifunctional or higher polycarboxylic acids is less than about 0.5 mol %, curability and vibration deadening performance may become insufficient. Alternatively, when the content of such trifunctional or higher polycarboxylic acids exceeds about 10 mol %, gelation may occur during production of the amorphous copolymerizable polyester resin.

Polyol bonding units which may be used to form the amorphous copolymerizable polyester resin can include, e.g., about 30 mol % or more, or preferably about 50 mol % or more, of glycol bonding units having four or more carbon atoms in an alkyl group in a side chain. Further, an upper limit of the content of such glycol bonding units may be as large as, e.g., 100 mol %. When the content of the glycol bonding units having four or more carbon atoms in the alkyl group in the side chain is less than about 30 mol %, the vibration deadening performance may become insufficient. Monomers which may be used to form such glycol bonding units can include, e.g., 2-methylpropanediol, 1,3-butanediol, neopentylglycol, 3-methylpentanediol, trimethylpentanediol, 2-methyl-1,8-octanediol, 3,3-dimethylol pentane, 3,3'-dimethylol-heptane, 8,13-methyleicosane diol, a reduction product of the dimer acid, neopentylglycol hydroxypivalate, etc. Such glycol bonding units may preferably include, e.g., 2-methylpropanediol, neopentylglycol, 3-methylpentanediol, and/or 3,3'-dimethylolheptane, which may provide desirable vibration deadening properties and ease of acquisition. Such glycols may be used singly or in combinations of two or more types.

Monomers which may be used to form polyol bonding units which do not include glycol bonding units having four or more carbon atoms in an alkyl group in the side chain (e.g., "other polyol units") can include, e.g., aliphatic glycols such as ethyleneglycol, propyleneglycol, 1,4-butanediol, 1,5-pentanediol, 1,6-hexanediol, 1,8-octanediol, 1,9-nonanediol, 1,10-decanediol, eicosanediol, diethyleneglycol, triethyleneglycol, polyethyleneglycol, and polytetramethyleneglycol polycarbonate diol; an alicyclic glycol such as 1,4-cyclohexanedimethanol and tricyclodecanedimethanol; and/or an aromatic diol such as an ethylene oxide additive, e.g., bisphenol A or bisphenol S or propylene oxide additive. Such polyols may be used singly or in combinations of two or more types.

Such monomers which may be used to form the polyol bonding units can include a trifunctional or higher polyol such as, e.g., trimethylolpropane, glycerin, and pentaerythritol, and they may be provided in a concentration small enough to not significantly degrade characteristics of the viscoelastic resin composition. For example, such trifunctional or higher polyols may be provided in a concentration of about 0.5 mol % or more, or preferably about 1 mol % or more. Such trifunctional or higher polyols may be provided in a concentration of about 10 mol % or less, or preferably about 5 mol % or less. For example, when the content of such trifunctional or higher polyols is less than about 0.5 mol %, the curability and the vibration deadening performance may become insufficient. When the content of such trifunctional or higher polyols exceeds about 10 mol %, gelation may occur during production of the amorphous copolymerizable polyester resin.

Many combinations of compositions of the amorphous copolymerizable polyester resin obtained from such polycarboxylic acid bonding units and polyol bonding units may be used in exemplary embodiments of the present invention.

Such combinations may be selected based, e.g., on a desired coagulation force of the resin, a bonding strength, a vibration deadening performance, etc.

For example, with respect to vibration deadening performance, a preferred combination may include about 40 mol % or more of the polycarboxylic acid bonding units that are aromatic dicarboxylic acid units, about 30 mol % or more of the polyol bonding units that are glycol bonding units having four or more carbon atoms in an alkyl group in the side chain, and a content of the trifunctional or higher polycarboxylic acid of about 0.5 mol % or more. A further preferable combination may include, e.g., about 50 mol % or more of the polycarboxylic acid bonding units as aromatic dicarboxylic acid units, about 50 mol % or more of the polyol bonding units as glycol bonding units having four or more carbon atoms in an alkyl group in the side chain, and a content of the trifunctional or higher polycarboxylic acid of about 1 mol % or more.

Further, conventional techniques may be used to add a ring-shaped ester group by open ring addition to the terminal end of the molecular chain for polymerization and to add polyhydroxycarboxylic acid block bonding units. Such additions can be used, e.g., to adjust a glass transition temperature of the amorphous copolymerizable polyester resin obtained from the polycarboxylic acid bonding units and the polyol bonding units as mentioned above, and/or to improve bondability and/or reactivity with a curing agent.

Polyhydroxycarboxylic acid block bonding units used in exemplary embodiments of the present invention can preferably be block copolymerizable. Ring-shaped esters which may be added to such polyhydroxycarboxylic acid block bonding units can include, e.g., β-propiolactone, β-2,2-dimethylpropiolactone, δ-valerolactone, δ-3-methylvalerolactone, ε-caprolactone, and/or enantolactone.

Production of Amorphous Copolymerizable Polyester Resin

Conventional techniques may be used to produce amorphous copolymerizable polyester resins used in exemplary embodiments of the present invention. For example, such techniques may include charging the polycarboxylic acid and polyol components in a vessel under a nitrogen atmosphere, performing an esterification and/or transesterification reaction under a constant temperature condition over a constant time, and then performing a polycondensation reaction under high vacuum under a constant temperature condition over a constant time. The temperature provided for such an esterification and/or transesterification reaction may preferably be more than about 140° C., or more preferably more than about 160° C. Further, the temperature may be preferably less than about 260° C., or more preferably less than about 240° C. For example, if the temperature is less than about 140° C., the reaction rate may be lowered, while if the temperature is greater than about 260° C., decomposition of the product may be significant.

Further, a reaction time of the esterification and/or transesterification reaction in the exemplary production technique described above may preferably be more than about 0.5 hours, or more preferably more than about 1 hour. Such reaction time may be preferably less than about 24 hours, or more preferably less than about 12 hours. For example, when such reaction time is less than about 0.5 hours, the esterification and/or transesterification reaction may not proceed sufficiently, while a reaction time exceeding 24 hours may not be preferable from an economic viewpoint.

The temperature provided for the polycondensation reaction may be preferably greater than about 180° C., or more preferably greater than about 200° C. Further, the temperature provided for the polycondensation reaction may preferably be less than about 300° C., or more preferably less than about 280° C. For example, when the temperature for the polycondensation reaction is less than about 180° C., the polycondensation may not proceed at a sufficient speed, while a temperature exceeding about 300° C. may lead to an insufficient molecular weight of the amorphous copolymerizable polyester resin due to decomposition of the product.

Further, in the exemplary production technique described above, the reaction time of the polycondensation reaction may be preferably greater than about 0.5 hour, or more preferably greater than about 1 hour. This polycondensation reaction time may also be preferably less than about 5 hours, or more preferably less than about 3 hours. For example, when this reaction time is less than about 0.5 hour, the polycondensation of the amorphous copolymerizable polyester resin may not proceed until a sufficient amount of molecules are obtained, while a reaction time exceeding about 5 hours may lead to a significant decomposition of the product.

In the exemplary production technique described above, a pressure in vessel at the time of the polycondensation reaction may be preferably less than about 660 Pa, or more preferably less than about 130 Pa. When the pressure in the vessel exceeds about 660 Pa, the polycondensation of the amorphous copolymerizable polyester resin may not proceed until a sufficient amount of molecules are obtained.

Such polycondensation reaction may preferably be performed by adding a catalyst, although it may be performed without a catalyst. A variety of catalysts may be used. For example, conventional polymerization catalysts for amorphous copolymerizable polyester resins may be used. Such catalysts can include, e.g., calcium acetate, zinc acetate, dibutyl tin oxide, dibutyl lead dilaurate, germanium oxide, antimony trioxide, tetrabutyl titanate, etc. These catalysts may be used singly or in combinations of two or more types.

A content of such catalyst in the polycondensation reaction solution can be preferably about 1 ppm or more, or more preferably about 30 ppm or more. Further, the content of this catalyst may be preferably less than about 5000 ppm, or more preferably less than about 2000 ppm. For example, when the content of this catalyst is less than about 1 ppm, the reaction rate may be lowered, while a catalyst content exceeding about 5000 ppm can lead to decomposition and/or coloring of the product.

Weight Average Molecular Weight of Amorphous Copolymerizable Polyester Resin

The weight average molecular weight of the copolymerizable polyester resin used in exemplary embodiments of the present invention, as measured by gel permeation chromatography (GPC) techniques, can preferably be about 5000 or more, or more preferably about 8000 or more. Further, this weight average molecular weight may preferably be less than about 50000, or more preferably less than about 40000, which can provide good workability in the production process of the viscoelastic resin composition.

For example, when this weight average molecular weight is less than about 5000, the vibration deadening performance and/or bonding strength of the viscoelastic resin composition may be lowered. Further, a large weight average molecular weight may be preferred to provide desirable vibration deadening performance and bonding strength of the viscoelastic resin composition. However, when this weight average molecular weight exceeds about 50000, the workability in the production process of the viscoelastic resin composition can be lowered, and thus may not be preferred.

Glass Transition Temperature of Amorphous Copolymerizable Polyester Resin

The temperature at which the vibration deadening performance is maximized can be determined based on the glass transition point temperature of the amorphous copolymerizable polyester resin. Thus, an amorphous copolymerizable polyester resin having a desirable glass transition point temperature may be selected such that a desired temperature peak of the vibration deadening property can be obtained. For example, when the composite vibration-deadening material is used near ordinary temperatures (e.g., room temperature), the glass transition point temperature of the amorphous copolymerizable polyester resin may preferably be greater than about $-60°$ C., or more preferably greater than about $-40°$ C. Further, this glass transition temperature may be preferably less than about $0°$ C., or more preferably less than about $-10°$ C. When the glass transition temperature is less than about $-60°$ C. or exceeds about $0°$ C., which may be based at least in part on the type and amount of the curing agent used, the vibration deadening performance may not be significant near ordinary temperatures.

The glass transition temperature of the amorphous copolymerizable polyester resin can be measured using conventional techniques, e.g., by using a differential scan calorimeter (DSC) or the like.

Curing Agent

The viscoelastic resin composition used in exemplary embodiments of the present invention can include a curing agent which is capable of forming cross-links by reaction with the amorphous copolymerizable polyester resin. Various curing agents may be used. For example, compounds able to form cross-links by reaction with the amorphous copolymerizable polyester resin may be preferably used. One or more types of curing agents may be used such as, e.g., polyepoxy compounds, polyisocyanate compounds, and/or acid anhydrides.

Curing agents which may be used in exemplary embodiments of the present invention can include, e.g., a polyepoxy compound, a polyisocyanate compound, or an acid anhydride, which may be used alone or in a mixture such as, e.g., a polyisocyanate compound and a polyepoxy compound, a polyepoxy compound and an acid anhydride, or a polyepoxy compound, an acid anhydride, and a polyisocyanate compound.

Thermosetting after incorporating the curing agent into the amorphous copolymerizable polyester resin to form cross-links can improve bondability of the viscoelastic resin composition. Thus, moldability and workability of the composite vibration-deadening material in exemplary embodiments of the present invention may improved, as well as heat resistance after shaping and processing. Hydrolysis resistance of the viscoelastic resin composition may also be improved, which may enhance durability of the composite vibration-deadening material.

Polyepoxy Compounds

Various polyepoxy compounds may be used in exemplary embodiments of the present invention such as, e.g., epibis type epoxy resins, aliphatic epoxy resins, alicyclic epoxy resins, glycidyl ether-based resins, glycidyl ester-based resins, glycidyl amine-based resins, novolac type epoxy resins, and/or heterocyclic epoxy resins. For example, a polyepoxy compound having two or more glycidyl groups in one molecule may be used to provide desirable curability.

Polyepoxy compounds used in exemplary embodiments of the present invention can include, e.g., bisphenol A diglycidyl ether, bisphenol A di-β-methylglycidyl ether, bisphenol F diglycidyl ether, bisphenol S diglycidyl ether, tetrahydroxyphenylmethane tetraglycidyl ether, resorcinol diglycidyl ether, brominated bisphenol A diglycidyl ether, novolac glycidyl ether, sorbitol glycidyl ether, polyalkyleneglycol diglycidyl ether, hydrogenated bisphenol A diglycidyl ether, a diglycidyl ether of bisphenol A alkyleneoxide additive, epoxyurethane resin, glycerol triglycidyl ether, trimethylolpropane triglycidyl ether, pentaerythritol tetraglycidyl ether, phthalic acid diglycidyl ester, tetrahydrophthalic acid diglycidyl ester, hexahydrophthalic acid diglycidyl ester, acrylic acid diglycidyl ester, dimer acid diglycidyl ester, diglycidyl-p-oxybenzoate ester, diglycidylpropylene urea, tetraglycidyl-diaminodiphenylmethane, triglycidyl isocyanate, epoxy polybutadiene, epoxy soybean oil, etc. Such polyepoxy compounds may be used singly or in combinations of two or more types. Bisphenol A diglycidyl ether, bisphenol F diglycidyl ether, and/or the novolac glycidyl ether compounds may be particularly preferred for providing desirable vibration deadening performance and bonding strength.

Polyisocyanate Compounds

A variety of polyisocyanate compound may be used in exemplary embodiments of the present invention such as, for example, aliphatic, alicyclic, or aromatic bifunctional or higher polyisocyanate compounds Further, trifunctional or higher polyisocyanate compounds may be preferable to provide desirable properties such as, e.g., volatility, bondability, and durability.

Polyisocyanate compounds which may be used can also include, e.g., diisocyanate compounds such as 2,4-tolylene diisocyanate, 2,6-tolylene diisocyanate (TDI), 4,4'-diphenylmethane diisocyanate (MDI), hexamethylene diisocyanate (HDI), isophorone diisocyanate (IPDI), phenylene diisocyanate, naphthalene diisocyanate, xylene diisocyanate, hydrogenated diphenylmethane diisocyanate, a blocked isocyanate compound and/or hydrogenated xylene diisocyanate, as well as terminal end isocyanate group-containing compounds obtained by reacting a trimer of these isocyanate compounds and an excessive amount of these isocyanate compounds with a low molecular active hydrogen compound such as ethylene glycol, propylene glycol, trimethylolpropane, glycerol, sorbitol, ethylene diamine, monoethanol amine, diethanol amine, triethanol amine, or a high molecular active hydrogen compound such as various types of polyester polyols, polyether polyols, and polyamides. Such polyisocyanate compounds can be used singly or in combinations of two or more types. Preferred polyisocyanate compounds can include, e.g., a trimer of TDI or HDI or a reaction product of TDI or HDI with trimethylol propane, which can provide desirable vibration deadening performance.

Acid Anhydrides

An acid anhydride may be incorporated together with the polyepoxy compound in the viscoelastic resin composition in accordance with exemplary embodiments of the present invention. For example, the polyepoxy compound may react with an acid terminal of a polyester or an acid anhydride or an OH terminal of the polyester may reacts with the acid anhydride to become an acid terminal. This acidic terminal may react with the epoxy compound, which can advance a cross-linking reaction. Thus, the acid anhydride can promote the cross-linking reaction of the viscoelastic resin composition.

Acid anhydrides which may be used can include, for example, aliphatic acid anhydrides, alicyclic acid anhydrides, and/or aromatic acid anhydrides, including those having one or more acid anhydride groups in a single molecule. Further, it may be preferable to use acid anhydrides having two or more acid anhydride groups in a single molecule, which can provide desirable curability.

Further examples of acid anhydrides which may be used include, e.g., phthalic acid anhydride, tetrahydrophthalic acid anhydride, hexahydrophthalic acid anhydride, methylnacic acid anhydride, chlorendic acid anhydride, trimellitic acid anhydride, pyromellitic acid anhydride, benzophenone tetracarbonate anhydride, dodecenyl anhydride succinic acid, maleic polybutene, polyadipic acid anhydride, and/or polyazelic acid anhydride.

When an epoxy compound and an acid anhydride are incorporated as a curing agent into the amorphous copolymerizable polyester resin and then thermoset to form the cross-linking, the terminal function group of the amorphous copolymerizable polyester resin may have a higher reactivity with a carboxyl group than a hydroxyl group. Thus, bondability of the viscoelastic resin composition may be further improved, and durability of the composite vibration-deadening material may thus be further enhanced.

Blended Amount of Curing Agents

A blended amount of the curing agent provided in the viscoelastic resin composition may vary according to the type and blended amount of the amorphous copolymerizable polyester resin to be incorporated and the desired properties of the composite vibration-deadening material. The blended amount of the curing agent may preferably be more than about 3% by weight, or more preferably, greater than about 5% by weight of a mixture containing the curing agent and the amorphous copolymerizable polyester resin. Further, the blended amount of this curing agent is preferably 50 parts by mass or less, particularly preferably 35 parts by mass or less. For example, when the blended amount of the curing agent is less than about 3% by weight, the curability of the viscoelastic resin composition and the bonding strength may be lowered. When the blended amount of the curing agent exceeds about 50% by weight, the solubility of the two is lowered, and both the bonding strength and vibration deadening performance may be lowered.

Other Components

A viscoelastic resin composition used in accordance with exemplary embodiments of the present invention may further include a viscosity imparting agent such as a phenolic compound, denatured rosin, gum rosin, coumarone-indene resin, and/or xylene resin (e.g., a tackifier) to improve vibration deadening properties of the viscoelastic resin composition. Such agent can be incorporated in an amount selected not to degrade desirable characteristics of the viscoelastic resin composition.

The viscoelastic resin composition may further incorporate various types of fillers, plasticizers, antioxidants, UV-ray absorbers, anti-static agents, and/or fire retardants, which again may be selected such that they do not degrade desirable characteristics of the viscoelastic resin composition. For example, resin strength may be increased by using various types of fibers such as, e.g., glass fiber, polyester fiber, polyethylene fiber, and/or carbon fiber, as well as various types of inorganic particles such as, e.g., calcium carbonate, magnesium carbonate, mica, talc, and/or kaolin.

Various types of plasticizers such as, e.g., diester phthalate, diester sebacate, triester trimellate, triphenyl phosphate, and/or paraffin chromate may be incorporated to further improve vibration deadening performance at a low temperature.

Antioxidants such as, e.g., a phenol system and/or a hindered amine system can be incorporated to improve heat resistance. Increasing bondability of other mixed inorganic substances with the resin can be achieved, e.g., by incorporating various types of coupling agents.

For example, coating properties may be improved by incorporating various types of leveling agents. Point contact electroresistance weldability can be provided, e.g., by incorporating various types of metals such as iron, stainless steel, nickel, aluminum, and/or copper which may be processed, for example, into a powder shape, a flake shape, and/or a filament shape. A conductive filler such as, e.g., carbon black, graphite, and/or carbon fiber may also be incorporated.

Bondability, Gel Fraction, and Heat Resistance

A viscoelastic resin composition used in exemplary embodiments of the present invention may preferably have a T peel (e.g., peeling) strength after curing of not less than about 70 N/25 mm when it is sandwiched between substrates made of metal as an intermediate layer. The gel fraction thereof preferably may become 50% or more. For example, when the T peel strength is less than about 70 N/25 mm, the layer may become easy to peel due to bending and bend back processing, and workability may thus not be obtained when it is used in a composite vibration-deadening material.

Further, when the gel fraction is about 50% or more, three-dimensional meshes having a high molecular chain that can prevent fluidity at a high temperature may be formed, and improved bonding strength and heat resistance may be obtained. However, when the gel fraction is less than about 50%, there can be many uncross-linked high molecular chains and fluidity at a high temperature may not be completely suppressed. Thus, the bonding strength and the heat resistance may become insufficient.

Further, when the viscoelastic resin composition is sandwiched as an intermediate layer between substrates made of metal, the retention rate of the T peel strength before and after heating in hot water at about 85° C. for about 72 hours may preferably be greater than about 80%, or more preferably greater than about 85%. When the retention rate is less than about 80%, there can be a high possibility of a decrease in bondability when used for a long period in a moist environment.

When the viscoelastic resin composition is sandwiched as an intermediate layer between substrates made of metal, the shear bonding strength after curing may preferably be about 500 N/cm$^2$ or more. When the shear bonding strength after curing is less than about 500 N/cm$^2$, peeling may become easy due to bending and bend back processing, and workability may not be obtained when used as a composite vibration-deadening material.

Further, when the viscoelastic resin composition is sandwiched as an intermediate layer between substrates made of metal, the retention rate of the T peel strength before and after heating at about 240° C. for about 1 hour is preferably about 80% or more, or more preferably about 85% or more. For example, when the retention rate is less than about 80%, the possibility of peeling can become high when undergoing a heat treatment process such as, e.g., baked coating and/or vulcanization after sealing.

Chromate-Free Bonding Undercoat

The chromate-free bonding undercoat which may be used on the metal plates in exemplary embodiments of the present invention can include, e.g., between about 5 and 50 mass % of silica, between about 5 and 50 mass % of polyester resin, between about 1 and 50 mass % of tannic acid, and between about 0 and 5 mass % of a silane coupling agent.

Silica

The chromate-free bonding undercoat may include a silica component which can improve bondability of the bonding undercoat to the metal sheet and further improve corrosion resistance. The silica may be, e.g., either colloidal silica or fumed silica. The mean grain size of the silica may preferably be about 1 μm or less.

The content of the silica in the chromate-free bonding undercoat can preferably be between about 5 and 50 mass %. For example, when the silica content is less than about 5 mass %, a sufficiently durable bondability may not be obtained, while a silica content exceeding about 50 mass % can lead to a brittle coat, and bondability when the resin-composite vibration-deadening material is processed may become poor.

Colloidal silica which may be used can include, e.g., Snowtex N (obtained, e.g., from Nissan Chemical Industries, Ltd). Examples of fumed silica which may be used can include, e.g., Aerosil 130, Aerosil TT600, Aerosil MOX80, etc. (obtained, e.g., from Nippon Aerosil Co., Ltd.).

Polyester Resins

The polyester resin component of the chromate-free bonding undercoat which may be used in exemplary embodiments of the present invention can improve bondability between the binder of the silica component of the chromate bonding undercoat and the amorphous copolymerizable polyester resin of the viscoelastic resin composition. The polyester resin can be provided using, e.g., a conventional water-soluble paint, etc. A resin other than a polyester resin can also be used as a binder of the silica, but bondability with the viscoelastic resin composition (e.g., amorphous copolymerizable polyester resin) may become low. Thus, a polyester resin may be preferable as a resin which may be added to the chromate-free bonding undercoat agent.

The content of the polyester resin in the chromate-free bonding undercoat can be preferably between about 5 and 50 mass %. For example, when it is less than about 5 mass %, binding to the silica may not be exhibited and a sufficient bondability may not be obtained. When the content of the polyester resin in the undercoat exceeds about 50 mass %, the durable bondability can be lowered, which may not be desirable.

An aromatic dicarbonate may be provided as an acid component of the polyester resin, such as, e.g., terephthalic acid, phthalic acid anhydride, naphthalene dicarbonate, etc. An acidic component other than an aromatic dicarbonate may also be used such as, for example, aliphatic dicarbonate and/or alicyclic dicarbonate. Such acid components may be used singly or in combinations of two or more types. Aliphatic and alicyclic dicarbonates which may be used include, e.g., succinic acid, adipic acid, azelic acid, sebacic acid, dodecane diacid, 1,4-cyclohexane dicarbonate, etc.

A diol component of the polyester resin can include, e.g., ethylene glycol, neopentyl glycol, diethylene glycol, 1,4-butanediol, 1,6-hexanediol, an ethylene oxide or a propylene oxide adduct of bisphenol A, etc.

Further, a polyester resin component of the chromate-free bonding undercoat may preferably have a number average molecular mass of about 7000 or more and a glass transition temperature of about 0° C. or more, which may provide a high strength of the chromate-free bonding undercoat.

The polyester resin may be dispersed in water using, e.g., an emulsifier or other surfactant. Further, a carboxyl group may also be introduced into the polyester resin and neutralized by addition of, e.g., ammonia, amine, or the like to improve dispersion in water.

Film-forming properties of the water-dispersed polyester resin can be improved, e.g., by addition of a water-soluble organic solvent such as acetone, methylethylketone, N-methyl-2-pyrrolidone, dioxane, and/or isopropyl alcohol in a concentration of about 10 mass % or less.

Tannic Acid

Tannic acid can increase bondability and durability of the bonding undercoat agent when used together with silica. For example, the content of the tannic acid in the chromate-free bonding undercoat may preferably be between about 1 and 50 mass %. When it is less than about 1 mass %, improvement of the bondability and corrosion resistance may be small, while when it exceeds about 50 mass %, curing of the viscoelastic resin composition may be inhibited and bondability may be reduced.

The tannic acid used may be, e.g., hydrolytic tannic acid or condensation type tannic acid, or it may be one obtained by partially decomposing one of these compositions. The tannic acid may also include, but is not limited to, hamamelitannic acid, gull nut tannic acid, gallic tannic acid, and/or catechin. Commercially available products may also be used.

Silane Coupling Agents

A silane coupling agent may be added in an amount of about 30 mass % or less as a component of the chromate-free bonding undercoat to improve bondability between the viscoelastic resin composition and the metal sheets. For example, when the silane coupling agent concentration exceeds about 30 mass % of the total chromate-free bonding undercoat components, the chromate-free bonding undercoat may become brittle, the bonding strength may be reduced, and the silane coupling agent may become undesirably easy to coagulate and solidify when preparing the chromate-free bonding undercoat agent.

Such silane coupling agents may include a functional group having reactivity with the resin. Silane coupling agent which may be used can include, for example, vinyl trichlorosilane, vinyltrimethoxysilane, vinyltriethoxysilane, vinyltris(β methoxylethoxy)silane, β-(3,4-epoxycyclohexyl)ethyltrimethoxysilane, γ-glycidoxypropyltrimethoxysilane, γ-glycidoxypropyltriethoxysilane, γ-methacrylxypropyl-methyldimethoxysilane, γ-methacryloxypropyl-methyldimethoxysilane, γ-methacryloxypropylmethyldiethoxysilane, γ-methacryloxypropyl-triethoxysilane, N-β(aminoethyl)γ-aminopropyl-methyldimethoxysilane, N-β(aminoethyl)γ-aminopropyltrimethoxysilane, N-β(aminoethyl)γ-aminopropyltriethoxysilane, γ-aminopropyl trim ethoxysilane, γ-aminopropyltriethoxysilane, N-phenyl-γ-aminopropyltrimethoxysilane, γ-chloropropyl-trimethoxysilane, γ-mercaptopropyltrimethoxysilane, etc. Silane coupling agents may be used singly or in combinations of two or more types.

Method of Preparation of Chromate-Free Bonding Undercoat Agent

A method for preparation of the chromate-free bonding undercoat agent can include mixing the components with an appropriate amount of water such that the mass ratio of solid components in the coat after drying may become between about 5 and 50 mass % of silica, between about 5 and 50 mass % of polyester resin, between about 1 and 50 mass % of tannic acid, and between about 0 and 30 mass % of silane coupling agent. Such components may be dissolved or dispersed, e.g., using a propeller-type agitator.

The pH of the chromate-free bonding undercoat agent may preferably be between about 2 and 10. When the pH is less than 2, the substrate metal sheet may be etched and the corrosion resistance may decrease. Alternatively, when the pH exceeds about 10, waterproof bondability of the viscoelastic resin composition may decrease due to an alkali component remaining in the coat.

The pH of the chromate-free bonding undercoat agent may be adjusted using various techniques. For example, the pH may be adjusted to the acid side using, for example, an organic acid such as formic acid, acetic acid, butylic acid, oxalic acid, succinic acid, lactic acid, L-ascorbic acid, tartaric acid, citric acid, DL-malic acid, malonic acid, maleic acid, or phthalic acid; a phosphoric acid such as metaphosphoric acid, pyrophosphoric acid, orthophosphoric acid, triphosphoric acid, or tetraphosphoric acid; or a fluoride such as zirconium hydrofluoric acid, titanium hydrofluoric acid, silicofluoride, or hydrofluoric acid.

The pH may be adjusted to the alkali side using, e.g., an amine compound such as methylamine, ethylamine, propylamine, isopropylamine, butylamine, amylamine, dimethylamine, diethylamine, dipropylamine, diisopropylamine, trimethylamine, triethylamine, tripropylamine, and triisopropylamine or ammonia.

Substrate Metal Sheets

Substrate metal sheet used for the composite vibration-deadening material in exemplary embodiments of the present invention can include various materials such as, e.g., steel sheet, aluminum sheet, titanium sheet, and/or copper sheet.

A surface-treated steel sheet may be used such as, for example, a phosphate treated steel sheet, a zinc treated steel sheet, a stainless steel sheet, an organic coated steel sheet, and/or a steel sheet having a resin surface.

Method of Forming a Chromate-Free Bonding Undercoat

A chromate-free bonding undercoat provided between substrate metal sheets and the viscoelastic resin composition in the composite vibration-deadening material can be formed, e.g., by first coating the chromate-free bonding undercoat agent on the substrate metal sheets having surfaces cleaned, e.g., using conventional techniques and then dried. A viscoelastic resin composition can then be formed using further conventional techniques.

For example, the chromate-free bonding undercoat agent can be coated using, e.g., a roll coater technique, a dipping technique, an electrostatic spraying technique, or a spray coating technique.

After coating the chromate-free bonding undercoat agent, the assembly may be dried, e.g., in a hot air drying oven, an infrared drying oven, an induction heating oven, or the like under conditions such that a maximum temperature is between about 80° C. and 150° C.

Method of Forming Viscoelastic Resin Composition Layer

The viscoelastic resin composition can be formed on a substrate metal sheet after forming a chromate-free bonding undercoat on the metal sheet. For example, the substrate metal sheet can be coated after formation of the chromate-free bonding undercoat using a viscoelastic resin dissolved or dispersed in an organic solvent or water using conventional techniques such as a curtain flow technique, a roll coater technique, a spray coating technique, a blade coater technique, etc., on the bonding surface of at least one substrate metal sheet. The solvent or water may then be dried, e.g., in a hot air drying oven, an infrared drying oven, an induction heating oven, or the like, and then the sheet may be heat press-fixed to another substrate metal sheet using a roll and a hot press at a temperature which can be not less than the glass transition temperature of the viscoelastic resin. For example, a sufficient bondability may not be obtained when press fixing the sheet at a temperature lower than the glass transition temperature.

The resin-composite vibration-deadening material may be heat treated after the press fixing at a temperature of approximately the glass transition temperature or greater. By providing heat treatment after press fixing, cross-linking of the viscoelastic resin layer can be promoted, and the bonding strength may be more stabilized.

Further, the composite vibration-deadening material may include a multilayer structure of the other resin composition and the viscoelastic resin composition such that the desirable characteristics thereof are not degraded.

EXAMPLES

Exemplary embodiments of the present invention are described in further detail herein below. However, such embodiments are not meant to limit the scope of the present invention.

Substrate Metal Sheet

The following materials were used to form substrate metal sheets of resin-composite vibration-deadening materials:

Cold rolled steel sheet (CR);

Hot dip galvanized steel sheet (GI): Zinc basis weight=45/45 ($g/m^2$);

Stainless steel sheet (SUS): Type=SUS304-2B finished;

Aluminum sheet (AL): Type=A1 100 system; and

Electrogalvanized steel sheet (EG): Zinc basis weight=3/3 ($g/m^2$).

Each substrate metal sheet had a thickness of about 0.5 mm, a vertical length of about 300 mm, and a lateral width of about 300 mm.

Degreasing Treatment

Each substrate metal sheet was alkali degreased (using Fine Cleaner 4336 made by Nihon Parkerizing Co., Ltd., which was spray treated for 2 minutes under conditions of 20 g/liter and a temperature of 60° C.), washed with deionized water for about 30 seconds, and then dried.

Coat Chromate-Free Bonding Undercoat Agent

A water-soluble chromate-free bonding undercoat agent as described below was coated on the bonding surface side of the degreased substrate metal sheet using a bar coater and dried under conditions for 1 minute in a drying oven under a 200° C. atmosphere, where the maximum temperature was about 100° C. or more.

Example 1

Chromate-Free Bonding Undercoat Agent

Components of an undercoat agent were blended and stirred together with deionized water such that the components included about 1 mass % of tannic acid (Tannic Acid AL made by Fuji Chemical Industry Co., Ltd.), about 49 mass % of colloidal silica (Snowtex N made by Nissan Chemical Industries, Ltd.), and about 50 mass % of a polyester resin (VYRONAL MD-1245 made by Toyobo Corporation). The total solid concentration of the components used to prepare a chromate-free bonding undercoat agent was about 6.3 mass %.

Example 2

Chromate-Free Bonding Undercoat Agent

Components of an undercoat agent were blended and stirred together with deionized water such that the components included about 50 mass % of tannic acid (Tannic Acid AL made by Fuji Chemical Industry Co., Ltd.), about 45 mass % of colloidal silica (Snowtex N made by Nissan Chemical Industries, Ltd.), and about 5 mass % of a polyester resin (VYRONAL MD-1245 made by Toyobo Corporation). The total solid concentration of the components used to prepare a chromate-free bonding undercoat agent was about 6.3 mass %.

Example 3

Chromate-Free Bonding Undercoat Agent

Components of an undercoat agent were blended and stirred together with deionized water such that the components included about 33 mass % of tannic acid (Tannic Acid AL made by Fuji Chemical Industry Co., Ltd.), about 33 mass % of colloidal silica (Snowtex N made by Nissan Chemical Industries, Ltd.), and about 34 mass % of a polyester resin (VYRONAL MD-1245 made by Toyobo Corporation). The total solid concentration of the components used to prepare a chromate-free bonding undercoat agent was about 6.3 mass %.

Example 4

Chromate-Free Bonding Undercoat Agent

A silane coupling agent (γ-glycidoxypropyltriethoxysilane made by GE Toshiba Silicones and having a solid content of 100%) was added to 70 parts by mass of the solution of the chromate-free bonding undercoat agent of Example 3 while stirring until a ratio of 30 parts by mass of the silane coupling agent was obtained to prepare a chromate-free bonding undercoat agent.

Comparative Example 1

Chromate-Free Bonding Undercoat Agent

A silane coupling agent (γ-glycidoxypropyltriethoxysilane made by GE Toshiba Silicones and having a solid content of 100%) was added to 68 parts by mass of the solution of the chromate-free bonding undercoat agent of Example 3 while stirring until a ratio of 32 parts by mass of the silane coupling agent was obtained to prepare a chromate-free bonding undercoat agent.

Comparative Example 2

Chromate-Free Bonding Undercoat Agent

Components were blended and stirred together with deionized water such that the components of the chromate-free bonding undercoat agent included about 52 mass % of tannic acid (Tannic Acid AL made by Fuji Chemical Industry Co., Ltd.), about 24 mass % of colloidal silica (Snowtex N made by Nissan Chemical Industries, Ltd.), and about 24 mass % of a polyester resin (VYRONAL MD-1245 made by Toyobo Corporation). The total solid concentration of the components used to prepare a chromate-free bonding undercoat agent was about 6.3 mass %.

Comparative Example 3

Chromate-Free Bonding Undercoat Agent

Components were blended and stirred together with deionized water such that the components of the chromate-free bonding undercoat agent included about 50 mass % of colloidal silica (Snowtex N made by Nissan Chemical Industries, Ltd.) and about 50 mass % of a polyester resin (VYRONAL MD-1245 made by Toyobo Corporation). The total solid concentration of the components used to prepare a chromate-free bonding undercoat agent was about 6.3 mass %.

Comparative Example 4

Chromate-Free Bonding Undercoat Agent

Components were blended and stirred together with deionized water such that the components of the chromate-free bonding undercoat agent included about 48 mass % of tannic acid (Tannic Acid AL made by Fuji Chemical Industry Co., Ltd.), about 4 mass % of colloidal silica (Snowtex N made by Nissan Chemical Industries, Ltd.), and about 48 mass % of a polyester resin (VYRONAL MD-1245 made by Toyobo Corporation). The total solid concentration of the components used to prepare a chromate-free bonding undercoat agent was about 6.3 mass %.

Comparative Example 5

Chromate-Free Bonding Undercoat Agent

Components were blended and stirred together with deionized water such that the components of the chromate-free bonding undercoat agent included about 24 mass % of tannic acid (Tannic Acid AL made by Fuji Chemical Industry Co., Ltd.), about 52 mass % of colloidal silica (Snowtex N made by Nissan Chemical Industries, Ltd.), and about 24 mass % of polyester resin (VYRONAL MD-1245 made by Toyobo Corporation). The total solid concentration of the components used to prepare a chromate-free bonding undercoat agent was about 6.3 mass %.

Comparative Example 6

Chromate-Free Bonding Undercoat Agent

Components were blended and stirred together with deionized water such that the components of the chromate-free bonding undercoat agent included about 48 mass % of tannic acid (Tannic Acid AL made by Fuji Chemical Industry Co., Ltd.), about 48 mass % of colloidal silica (Snowtex N made by Nissan Chemical Industries, Ltd.), and about 4 mass % of polyester resin (VYRONAL MD-1245 made by Toyobo Corporation). The total solid concentration of the components used to prepare a chromate-free bonding undercoat agent was about 6.3 mass %.

Comparative Example 7

Chromate-Free Bonding Undercoat Agent

Components were blended and stirred together with deionized water such that the components of the chromate-free bonding undercoat agent included about 24 mass % of tannic acid (Tannic Acid AL made by Fuji Chemical Industry Co., Ltd.), about 24 mass % of colloidal silica (Snowtex N made by Nissan Chemical Industries, Ltd.), and about 52 mass % of a polyester resin (VYRONAL MD-1245 made by Toyobo Corporation). The total solid concentration of the components used to prepare a chromate-free bonding undercoat agent was about 6.3 mass %.

Method of Measurement of Amount of Deposition of Chromate-Free Bonding Undercoat Agent The deposited amount of the chromate-free bonding undercoat agent on the substrate metal sheet was determined by measuring the amount of deposited Si on the substrate metal sheet (after coating and drying the chromate-free bonding undercoat agent) using a fluorescent X-ray measurement device (Fluorescent X-Ray Device RIX2000 made by Rigaku), and calculating the amount of deposition based on the rate of addition of the silica ($SiO_2$) and silane coupling agent in the chromate-free bonding undercoat agent and the computed specific gravity of the solution.

The components of the chromate-free bonding undercoat agents described in the examples above are shown in Table 1.

TABLE 1

Compositions of Exemplary Chromate-Free Bonding Undercoat Agents

| Components | | Ex. 1 | Ex. 2 | Ex. 3 | Ex. 4 | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|---|---|---|
| Comp. | Tannic acid | 1 | 50 | 33 | 23.1 | 22.44 | 52 | 0 | 48 | 24 | 48 | 24 |
| | Silica | 49 | 45 | 33 | 23.1 | 22.44 | 24 | 50 | 4 | 52 | 48 | 24 |
| | Polyester resin | 50 | 5 | 34 | 23.8 | 23.12 | 24 | 50 | 48 | 24 | 4 | 52 |
| | Silane coupling agent | 0 | 0 | 0 | 30 | 32 | 0 | 0 | 0 | 0 | 0 | 0 |
| | Concentration | 6.3 | 6.3 | 6.3 | 6.3 | 6.3 | 6.3 | 6.3 | 6.3 | 6.3 | 6.3 | 6.3 |

Tannic acid: Tannic acid AL made by Fuji Chemical Industry Co., Ltd.
Silica: Snowtex N made by Nissan Chemical Industries, Ltd.
Polyester resin: VYRONAL MD-1245 made by Toyobo Corporation
Silane coupling agent: γ-glycidoxypropyltriethoxysilane made by GE Toshiba Silicones Coat Viscoelastic Resin Composition Viscoelastic resin compositions as described below were coated on the bonding surfaces of the substrate sheets on which the chromate-free bonding undercoat agent was previously coated, and dried using a bar coater such that the resin layer thickness after coating and drying was about 50 μm.

Next, two substrate metal sheets coated by the resin were simultaneously placed in a hot air drying oven in a 220° C. atmosphere, dried for 2 minutes, then taken out. The resin coating surfaces were adhered to each other and immediately press fixed using a hard rubber roll with a linear pressure of about 130 N/cm.

Example 1

Viscoelastic Resin Composition

An amorphous copolymerizable polyester resin (e.g., a principal component of the viscoelastic resin composition) was prepared having an acid component including about 53 mol % of isophthalic acid, about 45 mol % of sebacic acid, and about 2 mol % of trimellitic acid anhydride, containing a diol component including about 60 mol % of 2-methyl-1,3-propane diol and about 40 mol % of 3,3'-dimethylolheptane, and having a molecular weight after polycondensation of about 25000 and a glass transition temperature of about −23° C.

Four parts by mass of benzophenone tetracarbonate anhydride (BTDA) and 13 parts by mass of epibis epoxy resin (Epotot YD8125 made by Toto Kasei) were dissolved into 100 parts by mass of the amorphous copolymerizable polyester resin, and blended as the curing component together with cyclohexanone/Sorbesso 100 (an aromatic hydrocarbon-based solvent made by Exxon Mobil Corporation) as a 1/1 solution (having a solid concentration of about 40%).

Triphenyl phosphine (TPP) in an amount of about 0.3 parts by mass as a curing accelerator was blended while stirring to prepare the viscoelastic resin composition.

Example 2

Viscoelastic Resin Composition

An amorphous copolymerizable polyester resin was prepared having an acid component including about 82 mol % of isophthalic acid, about 16 mol % of dimer acid, and about 2 mol % of trimellitic acid, containing a diol component including about 40 mol % of neopentyl glycol and about 60 mol % of 2-methyl-1,3-propanediol, and having a molecular weight after polycondensation of about 25000 and a glass transition temperature of about −4° C.

Four parts by mass of benzophenone tetracarbonate anhydride (BTDA) and 13 parts by mass of epibis epoxy resin (Epotot YD8125 made by Toto Kasei) were dissolved into 100 parts by mass of the amorphous copolymerizable polyester resin, and blended as the curing component together with cyclohexanone/Sorbesso 100 (an aromatic hydrocarbon-based solvent made by Exxon Mobil Corporation) as a 1/1 solution (having a solid content concentration of about 40%).

Triphenyl phosphine (TPP) in an amount of about 0.3 parts by mass as a curing accelerator was blended while stirring to prepare the viscoelastic resin composition.

Example 3

Viscoelastic Resin Composition

An amorphous copolymerizable polyester resin was prepared having an acid component including about 29 mol % of terephthalic acid, about 29 mol % of isophthalic acid, about 40 mol % of adipic acid, and about 2 mol % of trimellitic acid, containing a diol component including about 45 mol % of neopentyl glycol and about 55 mol % of ethylene glycol, and having a molecular weight after polycondensation of about 22000 and a glass transition temperature of about 4° C.

Four parts by mass of benzophenone tetracarbonate anhydride (BTDA) and 13 parts by mass of epibis epoxy resin (Epotot YD8125 made by Toto Kasei) were dissolved into 100 parts by mass of the amorphous copolymerizable polyester resin, and blended as the curing component together with cyclohexanone/Sorbesso 100 (aromatic hydrocarbon-based solvent made of Exxon Mobil Corporation) as a 1/1 solution (having a solid content concentration of about 40%).

Triphenyl phosphine (TPP) in an amount of about 0.3 parts by mass was blended while stirring as a curing accelerator to prepare the viscoelastic resin composition.

Example 4

Viscoelastic Resin Composition

Viscoelastic resin compositions as described in Example 1 and Example 3 above were blended in a 1:1 ratio, and 0.3 parts by mass of triphenyl phosphine (TPP) as a curing accelerator was blended while stirring to prepare the viscoelastic resin composition.

Example 5

Viscoelastic Resin Composition

The amorphous copolymerizable polyester resin of Example 1 was used (e.g., an acid component including about 53 mol % of isophthalic acid, about 45 mol % of sebacic acid, and about 2 mol % of trimellitic acid anhydride, a diol component including about 60 mol % of 2-methyl-1,3-propane diol and about 40 mol % of 3,3'-dimethylolheptane, a molecular weight after polycondensation of about 25000, and a glass transition temperature of about −23° C.). This resin was dissolved in a cyclohexanone/Sorbesso 100 (aromatic hydrocarbon-based solvent made by Exxon Mobil Corporation) as a 1/1 solution (having a solid concentration of about 40%).

Five parts by mass of Coronate HX (made by Nippon Polyurethane Industry Co., Ltd.) as a curing agent was blended with this viscoelastic resin composition solution while stirring to prepare a viscoelastic resin composition.

Comparative Examples 1-3

Viscoelastic Resin Composition

In Examples 1-3 of the viscoelastic resin compositions described above, the benzophenone tetracarbonate anhydride (BTDA) as the curing component, the epibis epoxy resin, and the triphenylphosphine (TPP) as the curing accelerator were not blended, but the amorphous copolymerizable polyester resin was used as-is as the thermosetting resin.

Comparative Example 4

Viscoelastic Resin Composition 100 parts by mass of acryl rubber (Nipol AR-51 made by Zeon Corporation) was pressed into a film having a thickness of about 50 μm by a hot press at 200° C. This film was sandwiched between undercoat treated steel sheet, each having a thickness of about 0.5 mm, and press fixed by a hot press at about 200° C. for about 60 seconds to obtain a composite vibration-deadening material.

Comparative Example 5

Viscoelastic Resin Composition 100 parts by mass of a hydrogen added styrene-based plastic elastomer (Hybrar made by Kuraray Co., Ltd.) was pressed into a film having a thickness of about 50 μm by a hot press at 200° C. This film was sandwiched between undercoat treated steel sheets, each having a thickness of about 0.5 mm, and press fixed using a hot press at about 200° C. for about 60 seconds to obtain a composite vibration-deadening material.

Comparative Example 6

Viscoelastic Resin Composition 100 parts by mass of an acrylic elastomer (Vamac HVG made by Mitsui DuPont Polychemical) was pressed into a film having a thickness of about 50 μm by a hot press at 200° C. This film was sandwiched between undercoat treated steel sheets, each having a thickness of about 0.5 mm, and press fixed using a hot press at about 200° C. for about 60 seconds to obtain a composite vibration-deadening material.

Method of Analysis of Amorphous Copolymerizable Polyester

The characteristics of the amorphous copolymerizable polyesters described above were analyzed using the following analysis techniques:

(1) Analysis of weight average molecular weight of amorphous copolymerizable polyester resin: The weight average molecular mass of the amorphous copolymerizable polyester resin was computed from the results of GPC measurement by using gel permeation chromatography (GPC) 150 c using tetrahydrofuran as an eluant at a column temperature of 35° C. and a flow rate of 1 ml/min to obtain a measurement value in polystyrene conversion.

(2) Analysis of glass transition temperature of amorphous copolymerizable polyester resin: The glass transition temperature of the amorphous copolymerizable polyester resin was determined using a differential scan calorimeter (DSC) DSC-220 made by Seiko Instruments Inc. at a temperature elevation rate of 20° C./min.

Components of the examples and comparative examples of the polyester-based viscoelastic resin compositions and characteristic analysis values thereof are shown in Table 2, and comparative examples of the viscoelastic resin compositions other than the polyester system are shown in Table 3.

TABLE 2

Properties of Exemplary Viscoelastic Resin COmpositions

| | | | Polyester-based viscoelastic resin composition (following blended amounts indicate parts by mass) | | | | | | | |
|---|---|---|---|---|---|---|---|---|---|---|
| | Component | | Ex. 1 | Ex. 2 | Ex. 3 | Ex. 4 | Ex. 5 | Comp. Ex. 1 | Comp. Ex. 2 | Comp. Ex. 3 |
| Composition | Polyester resin | | 100 | 100 | 100 | 100 | 100 | 100 | 100 | 100 |
| | Curing agent | Type | YD8125/ BTDA | YD8125/ BTDA | YD8125/ BTDA | YD8125/ BTDA | HX | None | None | None |

TABLE 2-continued

Properties of Exemplary Viscoelastic Resin COmpositions

Polyester-based viscoelastic resin composition
(following blended amounts indicate parts by mass)

| Component | | Ex. 1 | Ex. 2 | Ex. 3 | Ex. 4 | Ex. 5 | Comp. Ex. 1 | Comp. Ex. 2 | Comp. Ex. 3 |
|---|---|---|---|---|---|---|---|---|---|
| | Blended amount | 13/4 | 13/4 | 13/4 | 13/4 | 5 | 0 | 0 | 0 |
| | Curing accelerator (TPP) | 0.3 | 0.3 | 0.3 | 0.3 | 0 | 0 | 0 | 0 |
| Characteristics | Molecular weight | 25000 | 22000 | 22000 | — | 25000 | 25000 | 22000 | 22000 |
| | Glass transition temperature | −23° C. | −4° C. | 4° C. | −10° C. | −23° C. | −23° C. | −4° C. | −4° C. |

YD8125: Epibis type epoxy resin Epotot YD8125 made by Toto Kasei
BTDA: Benzophenone tetracarbonate dianhydride
HX: Aliphatic polyisocyanate Coronate HX made by Nippon Polyurethane Industry Co., Ltd.

TABLE 3

Exemplary Viscoelastic Resin Compositions

Viscoelastic resin composition

| | Comp. Ex. 4 | Comp. Ex. 5 | Comp. Ex. 6 |
|---|---|---|---|
| Resin type | Acrylic rubber Zeon Corporation Nipol AR-51 | Hydrogen-added styrene-based thermoplastic elastomer Kuraray Co., Ltd. Hybrar | Acrylic elastomer Mitsui DuPont Polychemical Vamac HVG |

Examples and Comparative Examples

Tables 4 and 5 show combinations of the materials of the resin-composite vibration deadening materials prepared using the exemplary substrate metal sheets, chromate-free bonding undercoat agents, and viscoelastic resin compositions described above, together with property evaluation results. For reference, the evaluation results of a resin-composite vibration-deadening material formed using a conventional chromate bonding undercoat agent (Zinchrom ZM1300AS made by Nihon Parkerizing Co., Ltd.) and Example 1 of a viscoelastic resin composition are shown in Table 5.

TABLE 4

Combination of resin-composite vibration-deadening material

| | Chromate-free | | | Evaluation results | | | | |
|---|---|---|---|---|---|---|---|---|
| Ex./Comp. Ex. | Substrate metal sheet | bonding undercoat agent See Table 1 (coating: mg/m²) | Viscoelastic resin composition See Tables 2 and 3 | Resin gel ratio (%) | Initial T peel strength (N/25 mm) | Initial shearing bonding strength | T peel strength after hot water treatment (N/25 mm) | Durable bondability evaluation |
| Ex. 1 | CR | Ex. 1, (250) | Ex. 1 | 80 | 110 | 1100 | 85 | ○ |
| Ex. 2 | CR | Ex. 2, (250) | Ex. 1 | 80 | 100 | 1000 | 80 | ○ |
| Ex. 3 | CR | Ex. 3, (250) | Ex. 1 | 80 | 105 | 1050 | 80 | ○ |
| Ex. 4 | CR | Ex. 4, (250) | Ex. 1 | 80 | 120 | 1150 | 95 | ○ |
| Ex. 5 | SUS | Ex. 1, (250) | Ex. 1 | 80 | 107 | 1070 | 78 | ○ |
| Ex. 6 | SUS | Ex. 2, (250) | Ex. 1 | 80 | 98 | 980 | 72 | ○ |
| Ex. 7 | SUS | Ex. 3, (250) | Ex. 1 | 80 | 105 | 1050 | 80 | ○ |
| Ex. 8 | SUS | Ex. 4, (250) | Ex. 1 | 80 | 120 | 1200 | 95 | ○ |
| Ex. 9 | CR | Ex. 3, (250) | Ex. 2 | 80 | 115 | 1100 | 85 | ○ |
| Ex. 10 | CR | Ex. 3, (250) | Ex. 3 | 85 | 135 | 1300 | 110 | ○ |
| Ex. 11 | CR | Ex. 3, (250) | Ex. 4 | 79 | 100 | 1000 | 80 | ○ |
| Ex. 12 | CR | Ex. 3, (250) | Ex. 5 | 53 | 85 | 850 | 70 | ○ |
| Ex. 13 | SUS | Ex. 3, (250) | Ex. 2 | 80 | 113 | 1130 | 90 | ○ |
| Ex. 14 | SUS | Ex. 3, (250) | Ex. 3 | 83 | 145 | 1450 | 115 | ○ |
| Ex. 15 | SUS | Ex. 3, (250) | Ex. 4 | 78 | 100 | 1000 | 78 | ○ |
| Ex. 16 | SUS | Ex. 3, (250) | Ex. 5 | 50 | 83 | 830 | 70 | ○ |
| Ex. 17 | GI | Ex. 3, (250) | Ex. 3 | 83 | 150 | 1500 | 120 | ○ |
| Ex. 18 | AL | Ex. 3, (250) | Ex. 3 | 80 | 140 | 1400 | 110 | ○ |
| Ex. 19 | EG | Ex. 3, (250) | Ex. 3 | 83 | 150 | 1500 | 115 | ○ |
| Ex. 20 | SUS | Ex. 3, (3) | Ex. 3 | 84 | 130 | 1400 | 95 | ○ |
| Ex. 21 | SUS | Ex. 3, (900) | Ex. 3 | 80 | 120 | 1250 | 90 | ○ |

Durable Bondability Evaluation Criteria

The initial T peel strength and T peel strength after hot water treatment were compared and evaluated by the bonding strength retention rate. Observed retention rates are indicated by the following symbols:

○: Bonding strength retention rate of 70% or more;

Δ: Bonding strength retention rate of 30% to less than 70%; and x: Bonding strength retention rate of less than 30%.

TABLE 5

(Continuation of Table 4)

| | | Combination of resin-composite vibration-deadening material | | Evaluation results | | | | |
| | | Chrome-free | | | | | | |
| Ex./Comp Ex. | Substrate metal sheet | Chromate-free bonding undercoat agent See Table 1 (coating: mg/m$^2$) | Viscoelastic resin composition See Tables 2 and 3 | Resin gel ratio (%) | Initial T peel strength (N/25 mm) | Initial shearing bonding strength | T peel strength after hot water treatment (N/25 mm) | Durable bondability evaluation |
|---|---|---|---|---|---|---|---|---|
| Comp. Ex. 1 | CR | Comp. Ex. 1 (250) | Ex. 1 | 80 | 70 | 650 | 50 | Δ |
| Comp. Ex. 2 | CR | Comp. Ex. 2 (250) | Ex. 1 | 70 | 72 | 650 | 50 | Δ |
| Comp. Ex. 3 | CR | Comp. Ex. 3, (250) | Ex. 1 | 80 | 115 | 1100 | 75 | Δ |
| Comp. Ex. 4 | CR | Comp. Ex. 4, (250) | Ex. 1 | 80 | 70 | 800 | 50 | ○ |
| Comp. Ex. 5 | CR | Comp. Ex. 5, (250) | Ex. 1 | 80 | 80 | 850 | 50 | Δ |
| Comp. Ex. 6 | CR | Comp. Ex. 6, (250) | Ex. 1 | 80 | 65 | 700 | 42 | ○ |
| Comp. Ex. 7 | CR | Comp. Ex. 7, (250) | Ex. 1 | 80 | 115 | 1100 | 70 | Δ |
| Comp. Ex. 8 | SUS | Comp. Ex. 1, (250) | Ex. 1 | 80 | 70 | 650 | 47 | Δ |
| Comp. Ex. 9 | SUS | Comp. Ex. 2, (250) | Ex. 1 | 68 | 70 | 660 | 40 | Δ |
| Comp. Ex. 10 | SUS | Comp. Ex. 3, (250) | Ex. 1 | 80 | 110 | 1020 | 70 | Δ |
| Comp. Ex. 11 | SUS | Comp. Ex. 4, (250) | Ex. 1 | 80 | 70 | 780 | 50 | ○ |
| Comp. Ex. 12 | SUS | Comp. Ex. 5, (250) | Ex. 1 | 80 | 75 | 830 | 50 | Δ |
| Comp. Ex. 13 | SUS | Comp. Ex. 6, (250) | Ex. 1 | 80 | 60 | 650 | 40 | Δ |
| Comp. Ex. 14 | SUS | Comp. Ex. 7, (250) | Ex. 1 | 80 | 110 | 1050 | 68 | Δ |
| Comp. Ex. 15 | CR | Ex. 3, (250) | Comp. Ex. 1 | 0 | 25 | 300 | 0 | x |
| Comp. Ex. 16 | CR | Ex. 3, (250) | Comp. Ex. 2 | 0 | 35 | 400 | 10 | x |
| Comp. Ex. 17 | CR | Ex. 3, (250) | Comp. Ex. 3 | 0 | 70 | 550 | 20 | x |
| Comp. Ex. 18 | CR | Ex. 3, (250) | Comp. Ex. 4 | 0 | 70 | 450 | 20 | x |
| Comp. Ex. 19 | SUS | Ex. 3, (250) | Comp. Ex. 1 | 0 | 20 | 300 | 0 | x |
| Comp. Ex. 20 | SUS | Ex. 3, (250) | Comp. Ex. 2 | 0 | 30 | 300 | 10 | Δ |
| Comp. Ex. 21 | SUS | Ex. 3, (250) | Comp. Ex. 3 | 0 | 56 | 530 | 20 | Δ |
| Comp. Ex. 22 | SUS | Ex. 3, (250) | Comp. Ex. 4 | 0 | 65 | 420 | 15 | x |
| Comp. Ex. 23 | SUS | Ex. 3, (2) | Ex. 1 | 83 | 120 | 1100 | 80 | Δ |
| Comp. Ex. 24 | SUS | Ex. 3, (905) | Ex. 1 | 76 | 110 | 050 | 70 | Δ |
| Comp. Ex. 25 | SUS | Ex. 3, (250) | Comp. Ex. 5 | 0 | 80 | 500 | 30 | Δ |
| Comp. Ex. 26 | SUS | Ex. 3, (250) | Comp. Ex. 6 | 0 | 90 | 700 | 50 | Δ |
| Ref. Ex. 1 | CR | Chromate agent, (210) | Ex. 1 | 80 | 120 | 1100 | 110 | ○ |
| Ref. Ex. 2 | SUS | Chromate agent, (210) | Ex. 1 | 80 | 110 | 1100 | 100 | ○ |

Durable Bondability Evaluation Criteria

The initial T peel strength and T peel strength after hot water treatment were compared and evaluated by the bonding strength retention rate. Observed retention rates are indicated by the following symbols:

◯: Bonding strength retention rate of 70% or more;

Δ: Bonding strength retention rate of 30% to less than 70%; and x: Bonding strength retention rate of less than 30%. The initial T peel strength and T peel Analysis and Evaluation Methods Analysis of the characteristics and evaluation of the performance of the exemplary viscoelastic resin compositions and composite vibration-deadening materials obtained as described in the above examples and comparative examples were performed using the following analysis and evaluation techniques:

(1) Evaluation of gel fraction of viscoelastic resin composition: A vibration deadening metal sheet having a coated sheet thickness of about 0.5 mm and a resin layer thickness of about 50 μm was prepared. The vibration deadening sheet was then peeled apart, and a portion having film remaining on one side was cut into a 25×50 mm piece which was then dipped in a solution of methylethylketone (MEK) for 3 minutes and dried. The weight ratio of the resin was determined by measuring the weight of the sample before and after dipping in the MEK solution.

(2) Evaluation of bonding strength (initial T peel strength) of viscoelastic resin composition: A sample having a width of about 25 mm and a length of about 150 mm was cut from a vibration deadening metal sheet having a coated sheet thickness of about 0.5 mm and a resin layer thickness of about 50 μm. The T peel (peeling) strength when pulling the front and back steel sheets of the end parts of the sample in a 180° direction was measured using a tensile tester (tension compression tester STA-1150 made by Orientec) at a tensile rate of about 50 mm/min and at a measurement temperature of about 23° C.

(3) Evaluation of bonding strength (initial shear bonding strength) of viscoelastic resin composition: A sample having a width of about 25 mm and a length of about 200 mm was cut from a vibration deadening metal sheet having a coated sheet thickness of about 0.5 mm and a resin layer thickness of about 50 μm. At the center of the sample, a superimposed portion of the front and back coated metal sheet layers having a length of about 12.5 mm and a width of about 25 mm for measuring the shear bonding strength was formed using a microcutter to cut a groove in the width direction of the front coated metal sheet layer of the vibration deadening metal sheet, and to cut a similar groove in the back coated metal sheet layer at a position about 12.5 mm away from the groove of the front coating so as to thereby prepare a shear bonding strength measurement sample.

A length between grooves cut in the front and back coated metal sheet layers of the prepared shear bonding strength measurement sample and the width of the sample were measured using calipers, and an area of the superimposed portion of the front and back coated metal sheet layers was determined.

The two end portions of the sample for measuring the shear bonding strength were fixed to a sample holder of the tensile tester (Autograph AG-10KNE made by Shimadzu Scientific Instruments Co., Ltd.). The tension load was then measured at a tensile rate of about 50 mm/min and at a measurement temperature of about 23° C. The measured tension maximum load was divided by the area of the superimposed portion of the front and back coated metal sheet layers to determine the bonding strength per unit area. This result was used as the shear bonding strength.

(4) Evaluation of durable bondability (T peel strength after hot water treatment) of composite vibration-deadening material: A sample having a width of about 25 mm and a length of about 150 mm was cut from a vibration deadening metal sheet having a coated sheet thickness of about 0.5 mm and a resin layer thickness of about 50 μm. The sample for measuring bondability was dipped in hot water having a temperature of about 85° C. for 72 hours. The bonding strength was then measured using the same technique as that for the initial T peel (peeling) strength described above.

(5) Evaluation of durable bondability: The initial T peel strength and the T peel strength after the hot water treatment were compared. The durable bondability was evaluated from the T peel strength retention rate by comparing these values of the T peel strength.

While the invention has been described with reference to specific embodiments chosen for purpose of illustration, it should be apparent that numerous modifications could be made thereto by those skilled in the art without departing from the basic concept and scope of the invention.

INDUSTRIAL APPLICABILITY

As described herein above, resin-composite vibration-deadening materials in accordance with exemplary embodiments of the present invention can be superior than conventional resin-composite vibration-deadening material from an environmental viewpoint, e.g., because they are chromate-free. In addition, the shaping properties of resin-composite vibration-deadening materials in accordance with exemplary embodiments of the present invention are excellent.

Further, observed durable bondability of such exemplary materials is equivalent to that of conventional resin-composite vibration-deadening materials, and such materials may thus be extremely useful as a vibration and noise reduction materials which may be produced without a significant load on the environmental. Accordingly, the present invention may have significant industrial applicability.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements, media and methods which, although not explicitly shown or described herein, embody the principles of the invention and are thus within the spirit and scope of the present invention. In addition, all publications referenced herein above are incorporated herein by reference in their entireties.

The invention claimed is:

1. A vibration-deadening material, comprising:
   a multilayer structure comprising an intermediate layer, a first metal sheet, and a second metal sheet, wherein the intermediate layer comprises a viscoelastic resin composition provided between the first metal sheet and the second metal sheet, and wherein:
   (i) the viscoelastic resin composition comprises a thermosetting resin which includes an amorphous copolymerizable polyester resin and a curing agent, wherein the amorphous copolymerizable polyester resin includes a polycarboxylic acid chosen from at least one of adipic acid, sebacic acid, dimer acid, hydrogenated dimer acid, or alkenylsuccinic acid in an amount of between approximately 5 mol % to approximately 50 mol % in whole polycarboxylic acid components, the amorphous copolymerizable polyester resin further including aromatic dicarboxylic acid in an amount of approximately 50 mol % or more in the whole polycarboxylic acid components, wherein the amorphous copolymerizable polyester resin includes a glass transition point temperature between approximately −40° C. and approximately −10° C., wherein a weight average molecular weight of the amorphous copolymerizable polyester resin is approximately 8,000 or more, a blended amount of the curing agent in the viscoelastic resin is approximately 3 parts by mass to approximately 35 parts by mass or more, with respect to 100 parts by weight of the amorphous copolymerizable polyester resin, and wherein the curing agents include at least one types of curing agents selected from the group consisting of polyepoxy compounds, acid anhydrides, and polyisocyanate compounds;

(ii) a first surface of the first metal sheet and a second surface of the second metal sheet contact the viscoelastic resin composition; and (iii) each of the first and second surfaces includes a bonding undercoat comprising between about 5 and 50 mass % of silica, between about 5 and 50 mass % of a polyester resin having a glass transition point temperature of approximately 0° C. or greater, between about 1 and 50 mass % of tannic acid, and between about 0 and 30 mass % of a silane coupling agent, and wherein the bonding undercoat is essentially free of chromate.

2. The vibration-deadening material of claim 1, wherein the curing agent comprises at least one type of a polyepoxy compound, a polyisocyanate compound, or an acid anhydride.

3. The vibration-deadening material of claim 1, wherein the amount of the bonding undercoat provided on each of the first and second surfaces is between about 3 and 900 mg/m².

4. The vibration-deadening material of claim 2, wherein the amount of the bonding undercoat provided on each of the first and second surfaces is between about 3 and 900 mg/m².

5. The vibration-deadening material of claim 1, wherein each of the first and second metal sheets comprises at least one of a steel sheet, a plated steel sheet, a stainless steel sheet, an aluminum sheet, or a titanium sheet.

6. The vibration-deadening material of claim 2, wherein each of the first and second metal sheets comprises at least one of a steel sheet, a plated steel sheet, a stainless steel sheet, an aluminum sheet, or a titanium sheet.

7. The vibration-deadening material of claim 3, wherein each of the first and second metal sheets comprises at least one of a steel sheet, a plated steel sheet, a stainless steel sheet, an aluminum sheet, or a titanium sheet.

* * * * *